INVENTORS.
ROBERT A. MILLER AND
WILLIAM O. LYTLE
BY Bradley & Bee
ATTORNEYS.

Patented Mar. 4, 1941

2,233,631

UNITED STATES PATENT OFFICE 2,233,631

PROCESS OF MANUFACTURING CELLULAR GLASS

Robert A. Miller, Tarentum, and William O. Lytle, New Kensington, Pa., assignors to Pittsburgh Plate Glass Company, a corporation of Pennsylvania Application December 28, 1937, Serial No. 182,048

5 Claims. (Cl. 49—77)

The present invention relates to the production of porous or cellular glass and more particularly to a process in which such glass is obtained by converting molten glass into a foamy mass which is then cooled to provide a solid product.

The primary object of this invention is to provide a process of converting molten glass into a cellular product, in which the use of a solid gas-producing material and the attendant difficulties of obtaining uniform distribution of the material and the resultant gas cells are obviated.

Other objects and advantages of the invention will become more readily apparent during the course of the following detailed description of the preferred embodiments thereof.

We are aware that cellular glass has been prepared by the addition of a gas-producing compound to molten glass. Such product has also been obtained by dissolving under pressure a suitable gas in the molten glass containing a pulverulent refractory material, such as silicon carbide, to provide points of departure and then releasing the pressure to permit the dissolved gas to expand.

These processes were not entirely satisfactory because it was difficult mechanically to incorporate the solid material uniformly throughout the molten glass without the escape of at least a substantial amount of the free gases. Usually it was necessary to add the gassing agents to a small amount of glass and then immediately to place the treated glass in a mold or molds, in order to control the development of the cellular glass. Such processes manifestly were slow and laborious and the expense involved was considerable.

Briefly stated, the present invention contemplates as one feature the formation of cellular glass by directly forcing a fluid such as a gas or a liquid, preferably as small bubbles or vesicles, into a body of molten glass to form therein a plurality of cells, thus obviating the expense and difficulty of mechanically dispersing a solid material into the glass.

Figure 1:
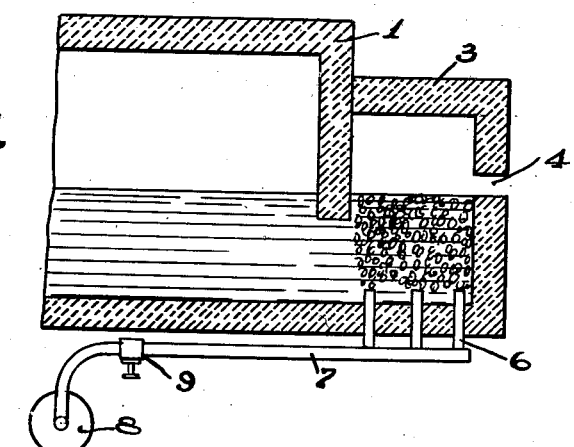
Figure 2:
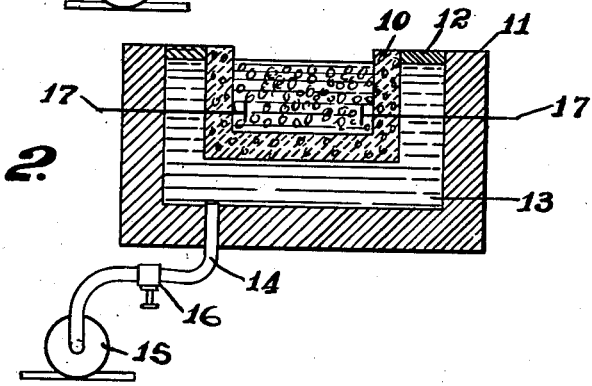

Certain embodiments of the present invention are shown in the accompanying drawing wherein: Figure 1 is a vertical sectional view of apparatus, particularly adapted for the production of cellular glass in a continuous operation. Figure 2 is a vertical sectional view of a modified form thereof and Figure 3 is a vertical sectional view of an apparatus suitable for converting molten glass into cellular form directly in a mold.

Referring to Figure 1 of the drawing, a melting furnace 1 of standard construction provides a continuous supply of molten glass which advances into a forehearth 3 having a suitable opening 4 for the removal of the froth of molten glass. For the purpose of converting the molten glass into a froth or foam, a plurality of jets 6 extend through the bottom of the forehearth 3 and are connected to a conduit 7 through which is forced a fluid impelled by a pump 8. A valve 9 is inserted in the conduit 7 to permit a control of the rate of fluid passing therethrough. Air, gas, superheated steam, or water is forced by the pump 8 into the molten glass contained in the forehearth 3 and produces therein small cells which tend to move vertically and spread throughout the molten glass to form the froth. The cellular glass so produced is removed from the forehearth 3 by dipping or drawing, by any suitable means, through the opening 4 and is then formed into sheets, blocks, or plates of the desired size and shape. In some cases it may be necessary to provide a means for cooling the upper surface of the glass contained in the forehearth 3 in order to prevent the escape of the gas bubbles from the glass. Air may be admitted to the upper portion of the forehearth for this purpose.

A process of manufacturing cellular glass conforming to the principles heretofore set forth may be conducted in other ways. For example, as shown in Figure 2 of the drawing, glass may be melted in or poured into a porous pot or tank 10 supported in spaced relation in a jacket 11, the space between the two being positively sealed from the atmosphere by an annular ring 12. The space 13 so provided is filled with a gas or liquid under pressure by means of a conduit 14 which is fed by a pump 15. A valve 16 is connected in the conduit 14 to control the rate of flow of the fluid therethrough. The fluid contained in the space 13 is forced through the porous pot 10 in many fine streams into the body of molten glass, thus converting the latter into a foamy or cellular mass. The molten glass may become chilled while in the pot 10 and accordingly electrodes 17 are provided therein to maintain the glass in a plastic state admitting the cell formation. The cellular glass produced in the pot 10 may be removed therefrom by any suitable means and formed into blocks or plates. The cellular glass may be drawn off as a continuous sheet or may be dipped out into suitable molds which are subsequently cooled and annealed to furnish the desired porous product.

Figure 3:
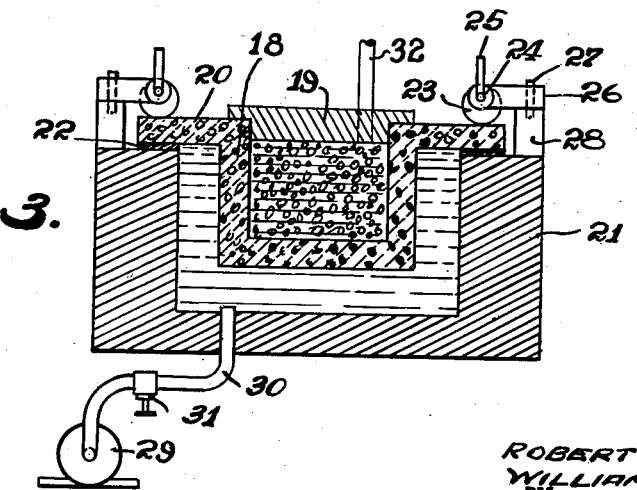

In the modification as illustrated in Figure 3, a porous mold 18 is provided with a cover plate 19 which may be secured thereto in any convenient manner (not shown). The mold 18 has formed integral therewith a flange 20 of a size sufficient to engage the upper lip of a container 21 especially constructed to support the mold. A sealing strip 22 is positioned between the flange 20 and the upper edge of the container 21 and the mold is locked into position in order that the space between the mold 18 and the container 21 is positively sealed from the atmosphere. The mold 18 is secured in the container 21 by means of cams 23 keyed to shafts 24, which shafts are manually operable by means of arms or handles 25 secured thereto, bringing the cams 23 into engagement with the flange 20. The shafts 24 are journaled in blocks 26, pivotally secured by vertical pins 27 to blocks 28 supported at spaced intervals upon the container 21. The mold 18 is partially filled with molten glass and the cover plate 19 positioned thereon. A fluid is forced by a pump 29 into the space between the mold 18 and the container 21 through a conduit 30, the rate of flow being controlled by a valve 31 connected in the conduit 30. The fluid thus applied to the container 21 is under pressure and is forced through the pores of the mold 18 into the molten glass contained therein. The admission of this fluid into the molten glass expands the mass and imparts thereto a cellular structure, the expansion being limited by the cover plate 19. The cover plate 19 prevents the bubbles from escaping from the glass and in addition serves to shape the top of the block of cellular glass. After the cellular glass is formed, the mold is removed from the container and emptied, and the block of cellular glass is annealed. Obviously the resulant product may be annealed while still in the mold, if desired, although such process will necessarily require a longer period of time.

Alternately, a mold constructed of non-porous material may be provided with air jets, similar to the jets 6, shown in Figure 1, and a gas may be forced under pressure into a small quantity of molten glass contained in the mold. Such procedure may be utilized for the production of lesser amounts of cellular glass and is contemplated as falling within the broad concepts of the present invention.

The formation and maintenance of the cellular structure of the material contained in the molds may be facilitated by the application of a vacuum over the upper surface thereof. The vacuum can be created by exhausting the air from the mold 18 through a conduit 32 which is connectable to a conventional vacuum pump (not shown) and which communicates with the interior of the mold 18 through the cover 19. In this connection the cover plate 19 could still be employed to limit the expansion of the cellular glass produced by the joint action of vacuum and fluid pressure.

The present process renders it possible to convert considerable quantities of molten glass into a foam, and if the molten glass is so fluid that the cellular structure tends to disintegrate, additional fluid may be added to the molten glass to maintain the proper or desired cellular nature. The foam may thus be maintained until it can be drawn off as a sheet, cast into molds, or otherwise treated. In the foregoing processes, the jets of fluid entering at the bottoms of the pools of molten glass tend to agitate the glass and to produce uniform distribution of the cells therethrough. Moreover, as the cells ascend through the molten glass, further distribution is attained. Generally the need for mechanical agitation of the glass in order to produce a uniform cellular structure is thus reduced or entirely obviated, but it may be utilized to produce cells of smaller size.

It will be seen, therefore, that the present invention provides for the production of cellular glass in a highly efficient manner. No contaminating reagents need be added to the glass, nor is the glass weakened by the removal therefrom of certain ingredients to produce the gas cells. Air, gas, superheated steam, or water may be forced into the molten glass to create gas cells therein and other gases or liquids could be used to equal advantage, if desired.

It will be obvious that various modifications or changes may be made in the instant process without departing from the spirit of the invention or the scope of the appended claims.

What we claim is:

1. A process of manufacturing cellular glass which comprises pouring a body of molten glass into a porous mold and forcing a fluid through the mold to produce a plurality of cells dispersed through the molten glass.

2. A process of manufacturing cellular glass which comprises pouring a body of molten glass into a porous mold and forcing a gas through the mold to produce a plurality of cells dispersed through the molten glass.

3. A process of manufacturing cellular glass which comprises pouring a body of molten glass into a pourous mold, heating the glass to maintain it in a plastic state, and forcing air through the mold to produce a plurality of cells dispersed through the molten glass.

4. A process of manufacturing cellular glass which comprises pouring a body of molten glass into a porous mold, forcing a fluid through the mold to produce a plurality of cells dispersed through the molten glass, and annealing the cellular glass so formed.

5. A process of manufacturing cellular glass which comprises providing a body of molten glass in a mold, forcing a fluid through the mold and simultaneously therewith applying a vacuum over the upper surface of the glass to produce a plurality of cells dispersed throughout the molten glass.

ROBERT A. MILLER.
WILLIAM O. LYTLE.